(12) United States Patent
Ueno et al.

(10) Patent No.: US 10,900,175 B2
(45) Date of Patent: Jan. 26, 2021

(54) BINDER, SHEET MANUFACTURING APPARATUS, SHEET MANUFACTURING METHOD, AND SHEET

(71) Applicant: SEIKO EPSON CORPORATION, Tokyo (JP)

(72) Inventors: Yoshihiro Ueno, Shiojiri (JP); Shogo Nakada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 116 days.

(21) Appl. No.: 16/148,437

(22) Filed: Oct. 1, 2018

(65) Prior Publication Data

US 2019/0100881 A1 Apr. 4, 2019

(30) Foreign Application Priority Data

Sep. 29, 2017 (JP) .................................. 2017-192073

(51) Int. Cl.
*D21H 21/06* (2006.01)
*C08L 67/00* (2006.01)
(Continued)

(52) U.S. Cl.
CPC .............. *D21H 21/06* (2013.01); *C08L 67/00* (2013.01); *D21B 1/026* (2013.01); *D21F 9/00* (2013.01);
(Continued)

(58) Field of Classification Search
None
See application file for complete search history.

(56) References Cited

U.S. PATENT DOCUMENTS 4,372,800 A * 2/1983 Oizumi .................... B29C 70/50
156/307.3
4,540,749 A * 9/1985 Meyer, Jr. ............... C08L 67/02
525/437
(Continued)

FOREIGN PATENT DOCUMENTS

JP H07-209897 A 8/1995
JP 3848052 B2 11/2006
(Continued)

OTHER PUBLICATIONS

"Polyethylene glycol 600", Sigma-Aldrich, [online], retrieved from the Internet, [retrieved Mar. 20, 2020], <URL:https://www.sigmaaldrich.com/catalog/product/mm/807486?lang=en&region=US>(Year: 2020).*
(Continued)

*Primary Examiner* — Dennis R Cordray
(74) *Attorney, Agent, or Firm* — Oliff PLC (57) ABSTRACT

Provided are a binder useful for making sheets processed to effectively prevent misfeeds, a sheet manufacturing apparatus capable of desirably manufacturing sheets processed to effectively prevent misfeeds, a sheet manufacturing method, and a sheet processed to effectively prevent misfeeds. The binder for binding fiber to make sheets includes resin; and polyhydric alcohol that is a solid at room temperature and changes to liquid phase when heated. The content of polyhydric alcohol to 100 parts by weight resin is greater than or equal to 0.1 parts by weight and less than or equal to 20 parts by weight polyhydric alcohol.

15 Claims, 3 Drawing Sheets

(51) Int. Cl.
  *D21H 17/53* (2006.01)
  *D21H 19/28* (2006.01)
  *D21H 23/20* (2006.01)
  *D21B 1/02* (2006.01)
  *D21H 21/52* (2006.01)
  *D21H 17/15* (2006.01)
  *D21F 9/00* (2006.01)

(52) U.S. Cl.
  CPC ............ *D21H 17/15* (2013.01); *D21H 17/53* (2013.01); *D21H 19/28* (2013.01); *D21H 21/52* (2013.01); *D21H 23/20* (2013.01)

(56) References Cited

U.S. PATENT DOCUMENTS

| | | | |
|---|---|---|---|
| 6,126,784 A * | 10/2000 | Ficke | D21H 23/72 162/184 |
| 9,868,854 B2 | 1/2018 | Ueno | |
| 2014/0290886 A1* | 10/2014 | Nagai | D21H 25/04 162/252 |
| 2016/0068681 A1 | 3/2016 | Ueno | |
| 2016/0229129 A1 | 8/2016 | Ueno | |
| 2016/0230320 A1 | 8/2016 | Ueno et al. | |
| 2018/0072002 A1 | 3/2018 | Ueno | |

FOREIGN PATENT DOCUMENTS

| | | |
|---|---|---|
| JP | 2015-92032 A | 5/2015 |
| JP | 2015-212429 A | 11/2015 |
| JP | 2016-056470 A | 4/2016 |
| JP | 2016-145427 A | 8/2016 |

OTHER PUBLICATIONS

"Polyethylene glycol 1000", Sigma-Aldrich, [online], retrieved from the Internet, [retrieved Mar. 20, 2020], <URL:https://www.sigmaaldrich.com/catalog/product/mm/807488?lang=en&region=US>. (Year: 2020).*

"Polyethylene glycol 2000", Sigma-Aldrich, [online], retrieved from the Internet, [retrieved Mar. 20, 2020], <URL:https://www.sigmaaldrich.com/catalog/product/mm/821037?lang=en&region=US>. (Year: 2020).*

"Polyethylene glycol 6000", Sigma-Aldrich, [online], retrieved from the Internet, [retrieved Mar. 21, 2020], <URL:https://www.sigmaaldrich.com/catalog/product/mm/807491?lang=en&region=US>. (Year: 2020).*

"Polyethylene glycol 10000", Sigma-Aldrich, [online], retrieved from the Internet, [retrieved Mar. 21, 2020], <URL:https://www.sigmaaldrich.com/catalog/product/sial/81280?lang=en&region=US>. (Year: 2020).*

"Polyethylene glycol 14000", Sigma-Aldrich, [online], retrieved from the Internet, [retrieved Mar. 21, 2020], <URL:https://www.sigmaaldrich.com/catalog/product/mm/637726?lang=en&region=US>. (Year: 2020).*

Smook, Gary A., Handbook for Pulp and Paper Technologists, 2nd ed, Angus Wilde Publications, 1992, p. 98. (Year: 1992).*

* cited by examiner

BINDER, SHEET MANUFACTURING APPARATUS, SHEET MANUFACTURING METHOD, AND SHEET

BACKGROUND

1. Technical Field

The present invention relates to a binder, a sheet manufacturing apparatus, a sheet manufacturing method, and a sheet.

2. Related Art

When loading paper into a printer, paper alignment is essential to stable printing. For trouble-free printing, the paper must be loaded in the paper cassette or tray of the printer with the paper properly aligned. Improper alignment of the paper can lead to the printer stopping due to paper feed failures (paper conveyance and picking), damage to the printer, incorrect print counts, reduced print quality due to multi-feeding, and various other unexpected problems. This has led to the development of paper joggers for aligning paper and other technologies for enabling consistent, high quality printing.

For example, one factor that can interfere with paper alignment is static electricity produced in the paper.

To suppress static electricity in the paper, the room temperature is preferably controlled to 23 to 25° C. and humidity to 55 to 65%, but adjustment to maintain these conditions regardless of the season or other equipment requires an air conditioning system.

To prevent the buildup of static electricity in plain paper manufactured in wet slurry processes, Japan Patent 3848052 proposes adding an antistatic agent to the size press chemicals, and then drying after coating or immersion.

However, this method requires a drying process after applying the size press chemicals in order to remove the water contained in the size press chemicals, and because a relatively large amount of water is used, the latent heat is great and a large amount of energy is required for drying. The dryer required for the drying process is therefore large. This technology also cannot be used in a dry process.

SUMMARY

An objective of the present invention is to provide a binder useful for making sheets processed to effectively prevent misfeeds, a sheet manufacturing apparatus capable of desirably manufacturing sheets processed to effectively prevent misfeeds, a sheet manufacturing method, and a sheet processed to effectively prevent misfeeds.

The invention achieves the foregoing objective as described below.

A binder according to the invention for binding fiber and making a sheet includes: resin; and polyhydric alcohol that is a solid at room temperature and changes to liquid phase when heated.

This configuration enables providing a binder that can be desirably used for making sheets that are processed to effectively prevent misfeeds.

In the binder according to the invention, the resin is preferably polyester.

This configuration enables desirably binding the fibers in the sheet, and further increases the paper strength of the sheet.

In the binder according to the invention, the polyhydric alcohol is preferably polyalkylene glycol.

As a result, the sheet resistance of the sheet can be further reduced, and production of static electricity can be prevented even more effectively. Affinity with cellulosic fiber is also further enhanced, and unintentional loss of polyhydric alcohol from the manufactured sheet is more effectively prevented. The paper strength and durability of the sheet are also further increased.

In the binder according to the invention, the content of polyhydric alcohol to 100 parts by weight resin is greater than or equal to 0.1 parts by weight and less than or equal to 20 parts by weight.

This configuration further enhances the paper strength and durability of the manufactured sheet together with even greater resistance to misfeeds.

In the binder according to the invention, the binder is preferably in a particle form.

This configuration enables desirably mixing the fiber and binder when manufacturing sheets, and further improves the reliability and consistency of the manufactured sheets. The binder is also easier to handle, and therefore useful as a means of improving productivity when making sheets.

In the binder according to the invention, the resin and the polyhydric alcohol are phase separated in the particles.

This enables desirably distributing the resin and polyhydric alcohol in the manufactured sheet.

In the binder according to the invention, the average particle size of the particles is preferably greater than or equal to 5 µm and less than or equal to 20 µm.

This configuration enables more desirably mixing the fiber and binder when manufacturing sheets, and further improves the reliability and consistency of the manufactured sheets. The binder is also easier to handle, and therefore more preferable as a means of improving productivity when making sheets.

In the binder according to the invention, the melting point of the polyhydric alcohol is higher than the glass transition temperature of the resin.

This more effectively prevents the loss of polyhydric alcohol from the sheet. The paper strength of the sheet can also be further increased.

Another aspect of the invention is a sheet manufacturing apparatus including: a defibrator configured to defibrate material containing fiber; a binder supply device configured to supply binder to the defibrated material defibrated by the defibrator; and a heater configured to heat the defibrated material to which the binder was added. The binder contains resin, and polyhydric alcohol that is a solid at room temperature and changes to liquid phase when heated.

This configuration provides a sheet manufacturing apparatus that can desirably manufacture sheets processed to effectively prevent misfeeds.

Another aspect of the invention is a sheet manufacturing method including: a defibrating step of defibrating material containing fiber; a binder supply step of supplying binder to the defibrated material defibrated in the defibrating step; and a heating step of heating the defibrated material to which the binder was added. The binder contains resin, and polyhydric alcohol that is a solid at room temperature and changes to liquid phase when heated; and the polyhydric alcohol contained in the binder changes to liquid phase during heating in the heating step.

This configuration provides a sheet manufacturing method that can desirably manufacture sheets processed to effectively prevent misfeeds.

Another aspect of the invention is a sheet made of fibers bonded by a binder, wherein: the binder contains resin, and polyhydric alcohol that is a solid at room temperature and changes to liquid phase when heated.

This configuration enables providing sheets that effectively prevent misfeeds.

In the sheet, the polyhydric alcohol is preferably concentrated at the surface of the sheet.

This configuration further improves the paper strength of the sheet while more effectively preventing production of static electricity in the sheets.

In the sheet, the sheet resistance of the sheet is preferably less than or equal to $70 \times 10^{10}$ Ω/square.

This configuration more effectively prevents production of static electricity in the sheets, and more effectively prevents misfeeds.

Other objects and attainments together with a fuller understanding of the invention will become apparent and appreciated by referring to the following description and claims taken in conjunction with the accompanying drawings.

DESCRIPTION OF EMBODIMENTS

Sheet Manufacturing Apparatus and Sheet Manufacturing Method

A sheet manufacturing apparatus 100 according to the invention has a defibrator 13 for defibrating material containing fiber, a binder supply device 171 that supplies a binder to the defibrated material defibrated by the defibrator 13, and a heater 202 that heats the defibrated material to which the binder was supplied. The binder contains resin, and polyhydric alcohol that is a solid at room temperature (25° C.) and changes to liquid phase when heated.

The sheet manufacturing method of the invention includes a defibration process for defibrating material containing fiber, a binder supply process of supplying a binder to the defibrated material defibrated by the defibration process, and a heating process of heating the defibrated material to which the binder was supplied. The binder contains resin, and polyhydric alcohol that is a solid at room temperature and changes to liquid phase when heated, and when heated in the heating process, the polyhydric alcohol contained in the binder changes to a liquid. This method is executed by the sheet manufacturing apparatus 100.

The invention enables desirably binding the fibers that form a sheet, reduces the sheet resistance of the sheet, and effectively prevents the occurrence of static electricity. Therefore, a sheet manufacturing apparatus and sheet manufacturing method that enable desirably making sheets processed to effectively prevent misfeeds can be provided. More specifically, sheets processed to effectively prevent misfeeds can be desirably manufactured even in a dry process that does not use a slurry process. Furthermore, because polyhydric alcohol molecules have multiple hydroxyl groups, affinity with cellulosic fiber is particularly strong, and unintentional loss from the manufactured sheet is prevented. Therefore, the effects described above can be kept stable for a long time. Under normal sheet usage and storage conditions, the polyhydric alcohol described above contributes to maintaining interfiber bond strength. Sheets with particularly good paper strength (such as the tensile strength) can therefore be produced.

A preferred embodiment of the invention is described below with reference to the accompanying figures.

Figure 1:
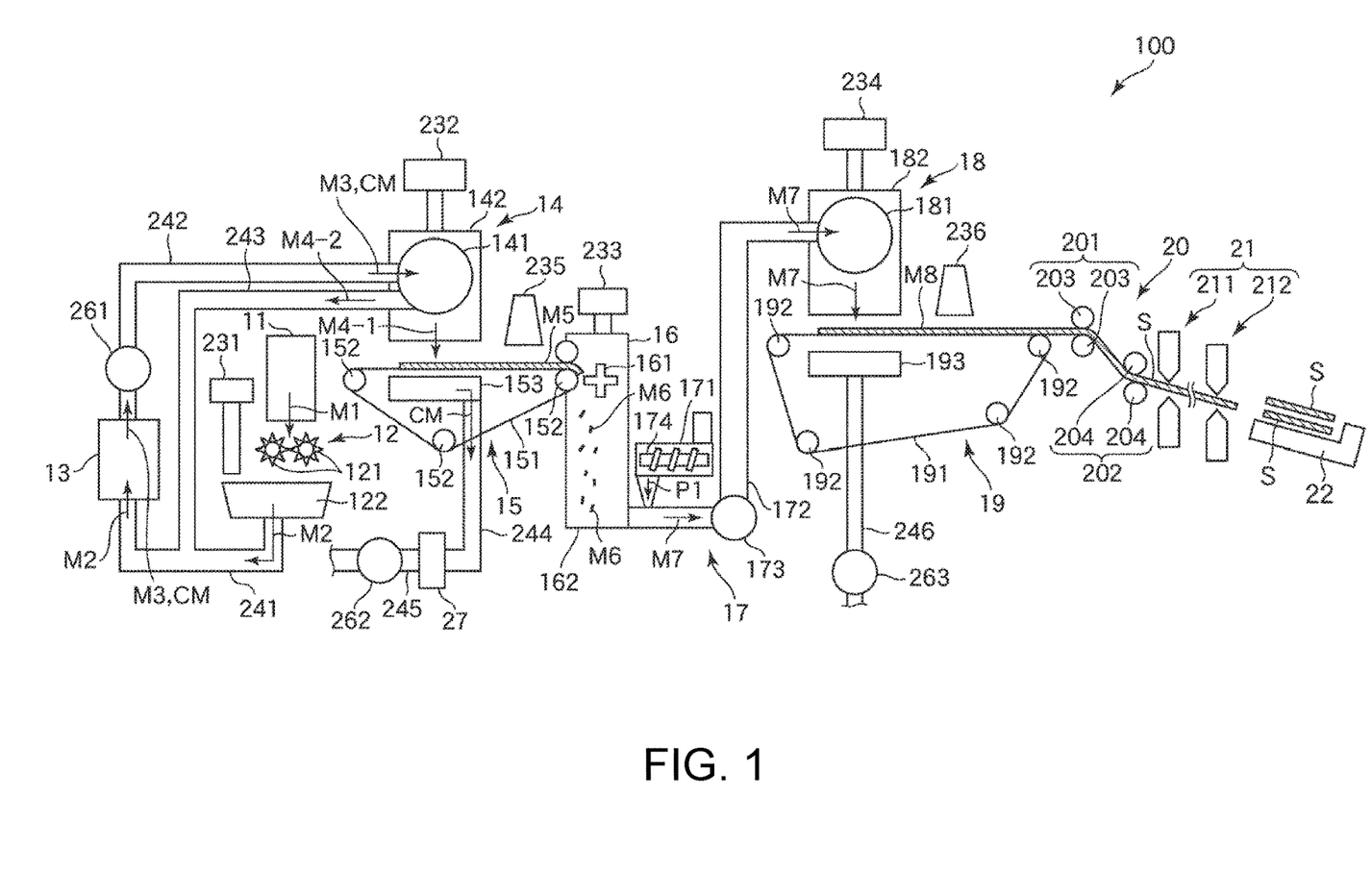
FIG. 1 schematically illustrates the configuration of a sheet manufacturing apparatus according to the invention.
Figure 2:
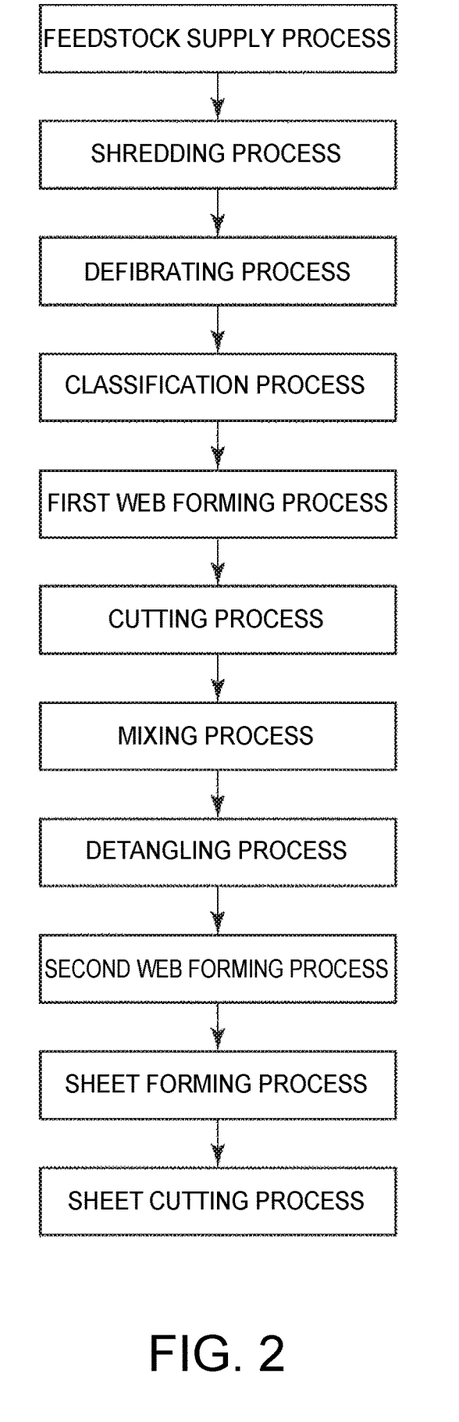
FIG. 2 illustrates the sequence of processes executed by the sheet manufacturing apparatus shown in FIG. 1.

FIG. 1 schematically illustrates the configuration of a sheet manufacturing apparatus according to the invention. FIG. 2 shows the sequence of processes executed by the sheet manufacturing apparatus shown in FIG. 1.

Note that for convenience below, the top as seen in FIG. 1 is referred to as the top or above, the bottom as the bottom or below; the left side as the left or upstream side, and the right as the right or downstream side.

As shown in FIG. 1, the sheet manufacturing apparatus 100 includes a feedstock supply device 11, a shredder 12, a defibrator 13, a classifier 14, a first web forming device 15, a cutter 16, a mixing device 17, a detangler 18, a second web forming device 19, a sheet forming device 20, a paper cutter 21, and a stacker 22. The sheet manufacturing apparatus 100 also has wetting unit 231, wetting unit 232, wetting unit 233, wetting unit 234, wetting unit 235, and wetting unit 236. Operation of parts of the sheet manufacturing apparatus 100 is controlled by a controller not shown.

As shown in FIG. 2, the sheet manufacturing method in this embodiment of the invention includes a feedstock supply process, a shredding process, a defibrating process, a classification process, a first web forming process, a cutting process, a binder supply process, a mixing process, a detangling process, a second web forming process, a heating process (sheet forming process), and a sheet cutting process.

The configuration of parts of the sheet manufacturing apparatus 100 is described next.

The feedstock supply device 11 is the part that executes the feedstock supply process (see FIG. 2) supplying feedstock M1 (sheets of material) to the shredder 12.

The feedstock M1 in this example is fiber-containing material including fiber (particularly cellulosic fiber), and in this example is in a sheet form. In this embodiment, the feedstock M1 is recovered paper, that is, sheets that have been used, but the invention is not so limited and the feedstock M1 may be sheets that have not been used.

Note that the cellulose fiber may be any fibrous material containing mainly cellulose (narrowly defined cellulose) as a chemical compound, and in addition to cellulose (narrowly defined cellulose) may include hemicellulose or lignin.

The shredder 12 is the part that executes the shredding process (see FIG. 2) of shredding, in air, the feedstock M1 supplied from the feedstock supply device 11. The shredder 12 has a pair of shredder blades 121 and a chute (hopper) 122.

By turning in opposite directions of rotation, the pair of shredder blades 121 shred the feedstock M1 passing therebetween, that is, cut the feedstock M1 into small shreds M2. The size and shape of the shreds M2 are preferably appropriate to the defibration process of the defibrator 13, and in this example are preferably pieces 100 mm or less on a side, and are further preferably pieces that are greater than or equal to 10 mm and less than or equal to 70 mm per side.

The chute 122 is located below the pair of shredder blades 121, and in this example is funnel-shaped. As a result, the chute 122 can easily catch the shreds M2 that are shredded and dropped by the shredder blades 121.

Above the chute 122, a wetting unit 231 is disposed beside the pair of shredder blades 121. The wetting unit 231 wets the shreds M2 in the chute 122. This wetting unit 231 has a filter (not shown in the figure) containing water, and is configured as a heaterless humidifier (or heated humidifier) that supplies a moist stream of air to the shreds M2 by passing air through the filter. By wet air being supplied to the shreds M2, shreds M2 sticking to the chute 122 due to static electricity can be suppressed.

The chute 122 connects to the defibrator 13 through a conduit (flow channel) 241. The shreds M2 collected in the chute 122 passes through the conduit 241 and are conveyed to the defibrator 13.

The defibrator 13 is the part that executes the defibrating process (see FIG. 2) that defibrates the shreds M2 (fiber-containing material including fiber) in a dry process in air. Defibrated material M3 can be produced from the shreds M2 by the defibration process of the defibrator 13.

As used herein, defibrate means to break apart and detangle into single individual fibers shreds M2 composed of many fibers bonded together. The resulting detangled fibers are the defibrated material M3. The shape of the defibrated material M3 is strings and ribbons. The defibrated material M3 may also contain clumps, which are multiple fibers tangled together into clumps.

The defibrator 13 in this embodiment of the invention, for example, is configured as an impeller mill having a rotor that turns at high speed, and a liner disposed around the rotor. Shreds M2 introduced to the defibrator 13 are defibrated between the rotor and the liner.

The defibrator 13, by rotation of the rotor, produces an air flow (current) from the shredder 12 to the classifier 14. As a result, shreds M2 can be suctioned from the conduit 241 to the defibrator 13. In addition, after the defibration process, the defibrated material M3 can be fed through another conduit 242 to the classifier 14.

The defibrator 13 also functions to separate from the fibers materials such as resin particles bonded with the defibrated material M3 (shreds M2), ink, toner, and other color material, and bleeding inhibitors.

The defibrator 13 also connects through a conduit 242 (flow path) to the classifier 14. The defibrated material M3 (fiber-containing material after defibration) is conveyed through the conduit 242 to the classifier 14.

A blower 261 is disposed in the conduit 242. The blower 261 is an air flow generator that produces a flow of air to the classifier 14. This promotes conveyance of the defibrated material M3 to the classifier 14.

The classifier 14 is the part that executes the classification process (see FIG. 2) of classifying the defibrated material M3 based on the length of the fibers. In the classifier 14, the defibrated material M3 is separated into first screened material M4-1, and second screened material M4-2 that is larger than the first screened material M4-1. The first screened material M4-1 is of a size appropriate to manufacturing sheets S (sheet material) downstream.

The second screened material M4-2 may also include, for example, material that has not been sufficiently defibrated, and excessively agglomerated (clumped) defibrated fibers.

The classifier 14 includes a drum 141, and a housing 142 enclosing the drum 141.

The drum 141 is a sieve comprising a cylindrical mesh body that rotates on its center axis. The defibrated material M3 is introduced to the drum 141 (sieve). By the drum 141 rotating, defibrated material M3 that is smaller than the mesh passes through and is separated as first screened material M4-1, and defibrated material M3 that is larger than the mesh and therefore does not pass through, is separated as second screened material M4-2.

The first screened material M4-1 drops from the drum 141.

The second screened material M4-2 is discharged to the conduit (flow path) 243 connected to the drum 141. The end of the conduit 243 on the opposite end (downstream end) as the drum 141 is connected to another conduit 241. The second screened material M4-2 that past through the conduit 243 merges with the shreds M2 inside the conduit 241, and is introduced with the shreds M2 to the defibrator 13. As a result, the second screened material M4-2 is returned to the defibrator 13 and again passes through the defibrating process with the shreds M2.

The first screened material M4-1 from the drum 141 is dispersed while dropping through air, and descends toward the first web forming device 15 (separator). The first web forming device 15 is the part that executes a first web forming process (see FIG. 2) forming a first web M5 from the first screened material M4-1. The first web forming device 15 includes a mesh belt (separation belt) 151, three tension rollers 152, and a suction unit (suction mechanism) 153.

The mesh belt 151 is an endless belt on which the first screened material M4-1 accumulates. This mesh belt 151 is mounted on three tension rollers 152. By rotationally driving the tension rollers 152, the first screened material M4-1 deposited on the mesh belt 151 is conveyed downstream.

The size of the first screened material M4-1 is greater than or equal to the size of the mesh in the mesh belt 151. As a result, passage of the first screened material M4-1 through the mesh belt 151 is limited, and as a result the first screened material M4-1 accumulates on the mesh belt 151. Furthermore, because the first screened material M4-1 is conveyed downstream by the mesh belt 151 as the first screened material M4-1 accumulates on the mesh belt 151, the first screened material M4-1 is formed in a layer as a first web M5.

The first screenings M4-1 may contain color material CM. This color material CM is smaller than the mesh of the mesh belt 151. As a result, the color material CM passes through the mesh belt 151 and precipitates.

The suction unit 153 suctions air from below the mesh belt 151. As a result, color material CM that has past through the mesh belt 151 can be suctioned together with the air.

The suction unit 153 is connected to a dust collector 27 (collection device) through another conduit (flow path) 244. Impurities suctioned by the suction unit 153 are captured by the dust collector 27.

Another conduit (flow path) 245 is also connected to the dust collector 27. A blower 262 is disposed to the conduit 245. Operation of the blower 262 produces suction in the suction unit 153. This promotes formation of the first web M5 on the mesh belt 151. The first web M5 is made from material from which color material CM has been removed. Operation of the blower 262 causes the color material CM to pass through the conduit 244 and reach the dust collector 27.

The housing 142 is connected to a wetting unit 232. Like the wetting unit 231 described above, the wetting unit 232 is a heaterless humidifier. As a result, wet air is supplied into the housing 142. This wet air moistens the first screened material M4-1, and as a result can suppress sticking of the first screened material M4-1 to the inside walls of the housing 142 due to static electricity.

Another wetting unit 235 is disposed downstream from the classifier 14. This wetting unit 235 is configured as an ultrasonic humidifier that mists water. As a result, moisture can be supplied to (can humidify or moisten) the first web M5, and the moisture content of the first web M5 can thereby be adjusted. This adjustment can also suppress sticking of the first web M5 to the mesh belt 151 due to static electricity. As a result, the first web M5 easily separates from the mesh belt 151 at the tension roller 152 from where the mesh belt 151 returns to the upstream side.

On the downstream side of the wetting unit 235 is a cutter 16. The cutter 16 is a part that executes a cutting process (see FIG. 2) of cutting the first web M5 that has separated from the mesh belt 151.

The cutter 16 has a propeller 161 that is rotationally supported, and a housing 162 that houses the propeller 161. The first web M5 is cut into pieces by the first web M5 being fed into the rotating propeller 161. The cut first web M5 becomes shreds M6. The shreds M6 then drop down in the housing 162.

The housing 162 is connected to another wetting unit 233. Like the wetting unit 231 described above, the wetting unit 233 is a heaterless humidifier. As a result, wet air is supplied into the housing 162. This wet air suppresses sticking of the shreds M6 to the propeller 161 and to the inside walls of the housing 162 due to static electricity.

A mixing device 17 is disposed on the downstream side of the cutter 16. The mixing device 17 includes a binder supply device 171, conduit 172 (flow path), and blower 173. The mixing device 17 is the part that executes a binder supply process (see FIG. 2) adding binder P1 to the shreds M6 (defibrated material), and a mixing process (see FIG. 2) of mixing the shreds M6 (defibrated material) with the binder P1.

The conduit 172 connects to the housing 162 of the cutter 16 and the housing 182 of the detangler 18, and is a flow path through which a mixture M7 of the shreds M6 and binder P1 passes.

The binder supply device 171 that supplies binder P1 to the shreds M6 (defibrated material) connects to the conduit 172. The binder supply device 171 has a screw feeder 174. By rotationally driving the screw feeder 174, the binder P1 can be supplied into the conduit 172. The binder P1 supplied to the conduit 172 is mixed with the shreds M6, forming the mixture M7.

A single type of binder P1 or multiple different binders P1 may be supplied through the binder supply device 171 (binder supply process). For example, the binder supply device 171 may be configured to select a particular binder P1 according to the type of sheet S to be manufactured, and in a process for manufacturing single sheets S, different binders P1 may be supplied at different times.

The binder P1 is described more fully below.

The blower 173 is disposed to the conduit 172 downstream from the binder supply device 171. The blower 173 is configured to produce an air current toward the detangler 18. This air current can also mix the shreds M6 and binder P1 inside the conduit 172. As a result, the mixture M7 can be introduced to the detangler 18 as a uniform dispersion of the shreds M6 and binder P1. The shreds M6 in the mixture M7 are further detangled into a smaller fiber form while travelling through the conduit 172.

The detangler 18 is the part that executes the detangling process (see FIG. 2) that detangles interlocked fibers in the mixture M7.

The detangler 18 includes a drum 181 and a housing 182 that houses the drum 181.

The drum 181 is a sieve comprising a cylindrical mesh body that rotates on its center axis. The mixture M7 is introduced to the drum 181. By the drum 181 rotating, fiber in the mixture M7 that is smaller than the mesh can pass through the drum 181. The mixture M7 is detangled in this process.

The mixture M7 that is detangled in the drum 181 is dispersed while dropping through air, and falls to the second web forming device 19 located below the drum 181. The second web forming device 19 is the part that executes the second web forming process (see FIG. 2) forming a second web M8 from the mixture M7.

The second web forming device 19 includes a mesh belt 191 (separation belt), tension rollers 192, and a suction unit 193 (suction mechanism).

The mesh belt 191 is an endless belt on which the mixture M7 accumulates. This mesh belt 191 is mounted on four tension rollers 192. By rotationally driving the tension rollers 192, the mixture M7 deposited on the mesh belt 191 is conveyed downstream.

Most of the mixture M7 on the mesh belt 191 is larger than the mesh in the mesh belt 191. As a result, the mixture M7 is suppressed from passing through the mesh belt 191, and therefore accumulates on the mesh belt 191. The mixture M7 is conveyed downstream by the mesh belt 191 as the mixture M7 accumulates on the mesh belt 191, and is formed in a layer as the second web M8.

The suction unit 193 suctions air down from below the mesh belt 191. As a result, the mixture M7 can be pulled onto the mesh belt 191, and accumulation of the mixture M7 on the mesh belt 191 is thereby promoted.

Another conduit 246 (flow path) is connected to the suction unit 193. A blower 263 is also disposed to the conduit 246. Operation of the blower 263 produces suction in the suction unit 193.

Another wetting unit 234 is connected to the housing 182. Like the wetting unit 231 described above, the wetting unit 234 is a heaterless humidifier. As a result, wet air is supplied into the housing 182. By humidifying the inside of the housing 182 by adding wet air, sticking of the mixture M7 to the inside walls of the housing 182 due to static electricity can be suppressed.

Another wetting unit 236 is disposed below the detangler 18. This wetting unit 236 is configured as an ultrasonic humidifier similarly to the wetting unit 235 described above. As a result, moisture can be supplied to the second web M8, and the moisture content of the second web M8 can thereby be adjusted. This adjustment can also suppress sticking of the second web M8 to the mesh belt 191 due to static electricity. As a result, the second web M8 easily separates from the mesh belt 191 at the tension roller 192 from where the mesh belt 191 returns to the upstream side.

A sheet forming device 20 is disposed downstream from the second web forming device 19. The sheet forming device 20 is the part that executes the sheet forming process (heating process) (see FIG. 2) forming sheets S from the second web M8. This sheet forming device 20 includes a calender 201 and a heater 202.

The calender 201 comprises a pair of calender rolls 203, and compresses the second web M8 between the calender rolls 203 without heating the second web M8. This process increases the density of the second web M8. The second web M8 is then conveyed toward the heater 202. Note that one of the pair of calender rolls 203 is a drive roller that is driven by operation of a motor (not shown in the figure), and the other is a driven roller.

The heater 202 has a pair of heat rollers 204, which can heat while compressing the second web M8 between the heat rollers 204. The combination of heat and pressure melts the resin and polyhydric alcohol contained in the binder P1

(producing a liquid) in the second web M8, and binds fibers through the molten binder P1. As a result, a sheet S is formed.

The sheet S is then conveyed to the paper cutter 21. Note that one of the pair of heat rollers 204 is a drive roller that is driven by operation of a motor (not shown in the figure), and the other is a driven roller.

The heating temperature of the heater 202 (the heating temperature in the heating process) is a preferably a temperature greater than or equal to the glass transition temperature of the rein in the binder, and greater than or equal to the melting point of the polyhydric alcohol in the binder.

This enables more desirably binding the fibers that make a sheet S, lowers the sheet resistance of the sheet S, and more effectively prevents production of static electricity in the sheet S. More particularly, this enables desirably concentrating polyhydric alcohol at the surface of the sheet S, and can more effectively prevent production of static electricity in the sheet S.

If the glass transition temperature of the resin in the binder is $Tg_R$ [° C.], the heating temperature of the heater 202 (the heating temperature in the heating process) is preferably greater than or equal to $(Tg_R+10)$ ° C. and less than or equal to $(Tg_R+100)$ ° C., further preferably greater than or equal to $(Tg_R+20)$ ° C. and less than or equal to $(Tg_R+90)$ ° C., and yet further preferably, is greater than or equal to $(Tg_R+30)$ ° C. and less than or equal to $(Tg_R+85)$ ° C.

As a result, the fibers forming a sheet S can be more desirably bonded, the sheet resistance of the sheet S can be further reduced, and production of static electricity in the sheet S can be prevented even more effectively. More particularly, this enables more desirably concentrating polyhydric alcohol at the surface of the sheet S, and more effectively preventing production of static electricity in the sheet S. This also prevents unintended modified degeneration of materials in the sheet S, suppresses the amount of energy required in the heating process, and is preferable with respect to energy conservation.

If the melting point of the polyhydric alcohol in the binder is $mp_A$ [° C.], the heating temperature of the heater 202 (the heating temperature in the heating process) is preferably greater than or equal to $(mp_A+1)$ ° C. and less than or equal to $(mp_A+90)$ ° C., further preferably greater than or equal to $(mp_A+10)$ ° C. and less than or equal to $(mp_A+80)$ ° C., and yet further preferably is greater than or equal to $(mp_A+20)$ ° C. and less than or equal to $(mp_A+75)$ ° C.

As a result, the fibers forming a sheet S can be more desirably bonded, the sheet resistance of the sheet S can be further reduced, and production of static electricity in the sheet S can be prevented even more effectively. More particularly, this enables more desirably concentrating polyhydric alcohol at the surface of the sheet S, and more effectively preventing production of static electricity in the sheet S. This also prevents unintended degradation of materials in the sheet S, suppresses the amount of energy required in the heating process, and is preferable with respect to energy conservation.

A paper cutter 21 is disposed downstream from the sheet forming device 20. The paper cutter 21 is the part that executes the sheet cutting process (see FIG. 3) that cuts the continuous sheet S into single sheets S. The paper cutter 21 includes a first cutter 211 and a second cutter 212.

The first cutter 211 cuts the sheet S in the direction crosswise to the conveyance direction of the sheet S.

The second cutter 212 is downstream from the first cutter 211, and cuts the sheets S in the direction parallel to the conveyance direction of the sheet S.

Sheets S of a desired size are produced by the cutting action of the first cutter 211 and the second cutter 212. The sheets S are then conveyed further downstream and stacked in a stacker 22.

Binder

A binder according to the invention is described below.

Figure 3:
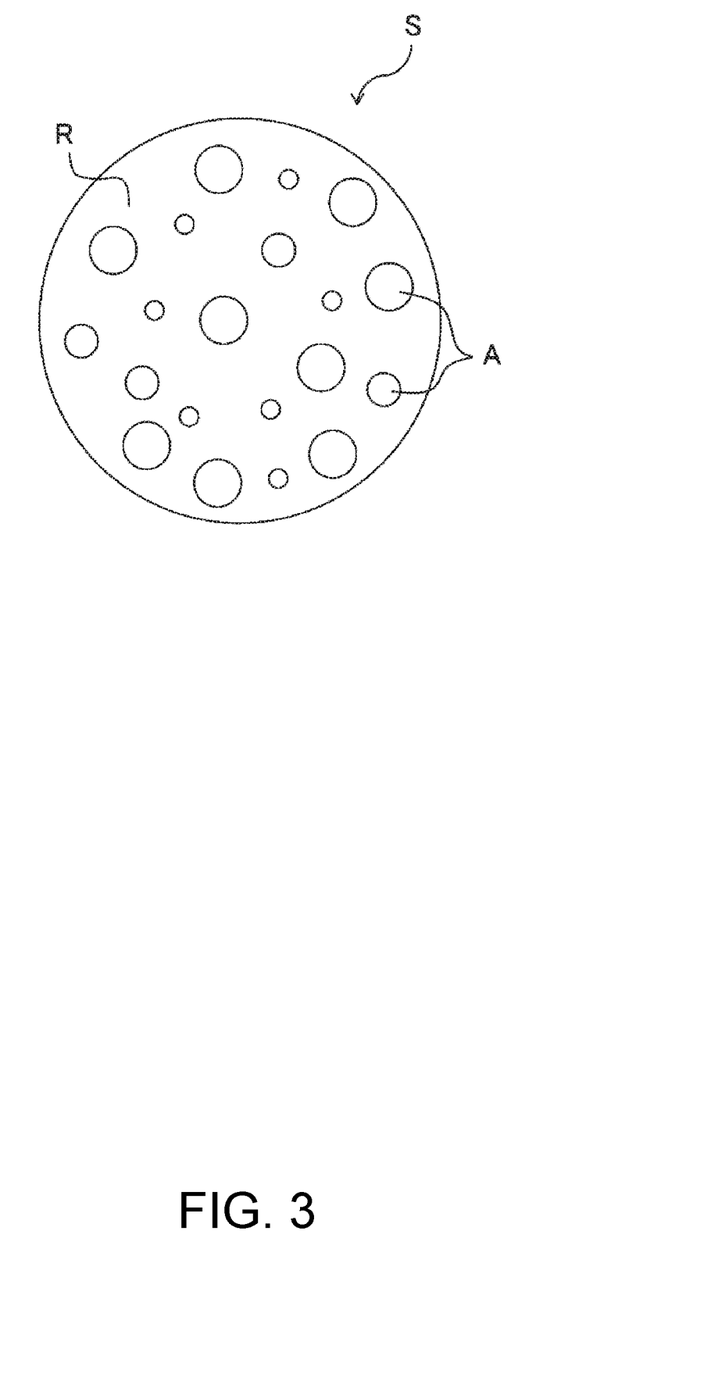
FIG. 3 is an enlarged view of a desirable example of a binder according to the invention.

FIG. 3 an enlarged view illustrating an example of a desirable form of a binder according to the invention.

A binder according to the invention is a binder for binding fibers together to make a sheet, and contains resin, and polyhydric alcohol that is a solid at room temperature and changes to liquid phase when heated. This binder can be desirably applied to make sheets in the sheet manufacturing apparatus and sheet manufacturing method according to the invention as described above.

A binder according to the invention enables desirably binding the fibers that form a sheet, reduces the sheet resistance of the sheet, and effectively prevents the occurrence of static electricity. The invention can therefore provide a binder that enables desirably making sheets processed to effectively prevent misfeeds. More specifically, sheets processed to effectively prevent misfeeds can be desirably manufactured even in a dry process that does not use a slurry process. Furthermore, because polyhydric alcohol molecules have multiple hydroxyl groups, affinity with cellulosic fiber is particularly strong, and unintentional loss from the manufactured sheet is prevented. Therefore, the effects described above can be kept stable for a long time. Under normal sheet usage and storage conditions, the polyhydric alcohol described above contributes to maintaining interfiber bond strength. Sheets with particularly good paper strength (such as the tensile strength) can therefore be produced.

Resin

Resin is the component of the binder that contributes greatly to improving interfiber bond strength.

Note that the resin used in the binder is different from the polyhydric alcohol described below, and may be a thermoplastic resin or thermosetting resin, but a thermoplastic resin is preferable.

Examples of such thermoplastic resins include AS resin, ABS resin, polyethylene, polypropylene, ethylene-vinylacetate copolymer (EVA), or other polyolefin, denatured polyolefins, polymethylmethacrylate or other acrylic resin, polyvinyl chloride, polystyrene, polyethylene terephthalate, polybutylene terephthalate, nylon 6, nylon 46, nylon 66, nylon 610, nylon 612, nylon 11, nylon 12, nylon 6-12, nylon 6-66 or other polyimide (nylon), polyphenylene ether, polyacetal, polyphenylene oxide, polyether ether ketone, polycarbonate, polyphenylene sulfide, thermoplastic polyimide, polyether imide, aromatic polyester, or other liquid crystal polymer, styrenes, polyolefins, polyvinyl chlorides, polyurethanes, polyesters, polyimides, polybutadienes, transpolyisoprenes, fluoroelastomers, polyethylene chlorides and other thermoplastic elastomers, as well as combinations of one or two or more of the foregoing.

A polyester is particularly desirable as the resin in the binder.

A polyester resin can even more desirably bind the fibers in a sheet, and further increase the paper strength of the sheet. Note that polyesters include modified polyester and polyester elastomers.

The hydroxyl value of the polyester is not specifically limited, but is preferably greater than or equal to 5 mg KOH/g and less than or equal to 50 mg KOH/g, further preferably greater than or equal to 10 mg KOH/g and less than or equal to 40 mg KOH/g, and yet further preferably greater than or equal to 15 mg KOH/g and less than or equal to 30 mg KOH/g.

This configuration can even more desirably bind the fibers in a sheet, further increase the paper strength of the sheet, and improve sheet durability.

The acid value of the polyester not specifically limited, but is preferably less than or equal to 200 mg KOH/g, further preferably less than or equal to 150 mg KOH/g, and yet further preferably less than or equal to 100 mg KOH/g.

This configuration can even more desirably bind the fibers in a sheet, further increase the paper strength of the sheet, and improve sheet durability.

The glass transition temperature of the resin is not specifically limited, but is preferably greater than or equal to 50° C. and less than or equal to 100° C., further preferably is greater than or equal to 55° C. and less than or equal to 90° C., and yet further preferably greater than or equal to 65° C. and less than or equal to 85° C.

This configuration enables more desirably suppressing the amount of energy required for the heating process, can more effectively prevent unintended modified degeneration of the sheet materials, and further improves the paper strength of the sheet.

The weight-average molecular weight of the resin is not specifically limited, but is preferably greater than or equal to 2,500 and less than or equal to 400,000, further preferably greater than or equal to 5,000 and less than or equal to 350,000, and yet further preferably greater than or equal to 8,000 and less than or equal to 300,000.

This configuration enables more desirably suppressing the amount of energy required for the heating process, can more effectively prevent unintended modified degeneration of the sheet materials, and further improves the paper strength of the sheet.

The resin content in the binder is not specifically limited, but is preferably greater than or equal to 75 wt % and less than or equal to 99.9 wt %, further preferably greater than or equal to 85 wt % and less than or equal to 99.7 wt %, and yet further preferably greater than or equal to 93 wt % and less than or equal to 99.5 wt %.

This configuration can yet further enhance the paper strength and durability of the manufactured sheet together with even greater resistance to misfeeds.

Polyhydric Alcohol

Polyhydric alcohol molecules have multiple hydroxyl groups, and of the components of the binder, contributes greatly to suppressing the occurrence of static electricity in the sheets.

The polyhydric alcohol may be any with multiple hydroxyl groups in the molecule, and may be a polymer of monomers having multiple hydroxyl groups.

This configuration can more effectively lower the sheet resistance of the sheet, and more effectively prevent static electricity. Affinity with cellulosic fiber can also be further enhanced, and unintentional loss of polyhydric alcohol from the manufactured sheet can be more effectively prevented. The effects described above can therefore be kept stable for a longer time. The paper strength of the sheet can also be further increased.

When the polyhydric alcohol is a polymer, the polyhydric alcohol preferably does not have an acid component in the monomer, and includes a monomer with multiple hydroxyl groups (such as polyether).

This configuration further enhances the effects described above, and further improves sheet durability.

When the polyhydric alcohol is a polymer, the hydroxyl value of the polymer is preferably greater than the hydroxyl value of the resin described above, and more specifically is greater than or equal to 35 mg KOH/g and less than or equal to 400 mg KOH/g, further preferably greater than or equal to 45 mg KOH/g and less than or equal to 350 mg KOH/g, and yet further preferably greater than or equal to 50 mg KOH/g and less than or equal to 300 mg KOH/g.

As a result, the sheet resistance of the sheet can be further reduced, and static electricity can be prevented even more effectively. Affinity with cellulosic fiber can also be further enhanced, and unintentional loss of polyhydric alcohol from the manufactured sheet can be more effectively prevented. The paper strength of the sheet can also be further increased.

When the polyhydric alcohol is a polymer, the polyhydric alcohol is preferably polyalkylene glycol.

As a result, the sheet resistance of the sheet can be further reduced, and static electricity can be prevented even more effectively. Affinity with cellulosic fiber can also be further enhanced, and unintentional loss of polyhydric alcohol from the manufactured sheet can be more effectively prevented. The paper strength and durability of the sheet can also be further increased.

A monomer (alkylene glycol) of polyalkylene glycol can be written as shown in formula (1).

$$(C_nH_{2n})(OH)_2 \tag{1}$$

where n is an integer of 1 or more.

The alkylene glycol in the polyalkylene glycol preferably has a hydroxyl group at both ends of the molecular chain.

As a result, the sheet resistance of the sheet can be further reduced, and static electricity can be prevented even more effectively. Affinity with cellulosic fiber can also be further enhanced, and unintentional loss of polyhydric alcohol from the manufactured sheet can be more effectively prevented. The paper strength and durability of the sheet can also be further increased.

Examples of the alkylene glycol in the polyalkylene glycol include ethylene glycol, propylene glycol, butylene glycol, pentene glycol and hexene glycol.

This configuration further enhances the effects described above.

Note that the polyalkylene glycol may contain multiple different alkylene glycols.

The melting point of the polyhydric alcohol is preferably higher than the glass transition temperature of the resin.

This effectively prevents the loss of polyhydric alcohol from the sheet. The paper strength of the sheet (particularly tensile strength) can also be further increased.

The specific value of the melting point of the polyhydric alcohol is not specifically limited, but is preferably greater than or equal to 55° C. and less than or equal to 120° C., further preferably greater than or equal to 60° C. and less than or equal to 110° C., and yet further preferably greater than or equal to 70° C. and less than or equal to 95° C.

This configuration more desirably suppresses the amount of energy required for the heating process, can more effectively prevent unintended modified degeneration of the materials in the sheet, further inhibits sheet misfeeds, and further improves the paper strength.

The number-average molecular weight of the polyhydric alcohol is not specifically limited, but is preferably greater than or equal to 5000 and less than or equal to 60,000, and further preferably is greater than or equal to 8000 and less than or equal to 40,000.

This configuration enables more desirably suppressing the amount of energy required for the heating process, can more effectively prevent unintended modified degeneration of the sheet materials, further inhibits sheet misfeeds, and further improves the paper strength.

The polyhydric alcohol content of the binder is not specifically limited, but is preferably greater than or equal to 0.1 wt % and less than or equal to 18 wt %, further preferably greater than or equal to 0.3 wt % and less than or equal to 9.5 wt %, and yet further preferably greater than or equal to 0.5 wt % and less than or equal to 3.8 wt %.

This configuration can yet further enhance the paper strength and durability of the manufactured sheet together with even greater resistance to misfeeds.

The polyhydric alcohol content to 100 parts by weight of the resin in the binder is not specifically limited, but is preferably greater than or equal to 0.1 parts by weight and less than or equal to 20 parts by weight, further preferably greater than or equal to 0.3 parts by weight and less than or equal to 10 parts by weight, and yet further preferably greater than or equal to 0.5 parts by weight and less than or equal to 4.0 parts by weight.

This configuration can yet further enhance the paper strength and durability of the manufactured sheet together with even greater resistance to misfeeds.

Other Components

The binder may contain other components than those described above.

Examples of such components include coloring agents such as pigments and dyes, flame retardants, and flow improvers. When the binder is in a particle form, other components may be included as coating to the particles.

By providing a coating on the binder, the binder has excellent fluidity even when dry.

The content of other components in the binder is preferably less than or equal to 10 wt %, and further preferably less than or equal to 5 wt %.

The binder may be processed into block (clumps), pellet, scale, needle, fiber, or particle (granular) form, but is preferably processed into granular particles.

This configuration enables desirably mixing the fiber and binder when manufacturing sheets, and further improves the reliability and consistency of the manufactured sheets. The binder is also easier to handle, and therefore preferable as a means of improving productivity when making sheets.

The binder may comprise resin and polyhydric alcohol as separate particles, but the resin and polyhydric alcohol are preferably contained in separate phases in the particles.

This enables desirably distributing the resin and polyhydric alcohol in the manufactured sheet.

More specifically, the binder S in particle form shown in FIG. 3 contains numerous polyhydric alcohol A micropar­ticles in the resin R.

This configuration effectively prevents unintentional bleeding of polyhydric alcohol while the binder is stored, and enables desirably distributing the resin and polyhydric alcohol in the manufactured sheets.

The average particle size of the particles is not specific, but is preferably greater than or equal to 5 μm and less than or equal to 20 μm, further preferably greater than or equal to 6 μm and less than or equal to 18 μm, and yet further preferably greater than or equal to 7 μm and less than or equal to 16 μm.

This configuration enables more desirably mixing the fiber and binder when manufacturing sheets, and further improves the reliability and consistency of the manufactured sheets. The binder is also even easier to handle, and there­fore more preferable as a means of improving productivity when making sheets.

Note that the average particle size as used herein is the volume-based average particle size.

Sheet

A sheet according to the invention is a made by binding fibers with the binder described above. In other words, a sheet according to the invention is a sheet in which the fibers are bonded by the binder of the invention, and the binder includes resin and a polyhydric alcohol that is a solid at room temperature and changes to liquid phase when heated. The sheet of the invention can be desirably manufactured using the sheet manufacturing apparatus and manufacturing method described above.

The invention can therefore provide a sheet processed to effectively prevent misfeeds. In addition, the effects described above can be kept stable for a long time. The paper strength of the sheet is also particularly high.

The resin and polyhydric alcohol may be distributed uniformly in the sheet of the invention, but the polyhydric alcohol is preferably concentrated at the surface of the sheet.

This further enhances the paper strength of the sheet, and more effectively prevents static electricity in the sheet.

The binder content in the sheet is not specifically limited, but is preferably greater than or equal to 0.05 wt % and less than or equal to 45 wt %, further preferably greater than or equal to 1.0 wt % and less than or equal to 40 wt %, and yet further preferably greater than or equal to 2.0 wt % and less than or equal to 35 wt %.

This ensures excellent paper strength, durability, and misfeed resistance in the sheet while sufficiently exhibiting the characteristics (such as liquid absorption) of the fibers in the sheet.

The sheet resistance of the sheet is preferably less than or equal to $70 \times 10^{10}$ Ω/square, further preferably less than or equal to $50 \times 10^{10}$ Ω/square, and yet further preferably less than or equal to $30 \times 10^{10}$ Ω/square.

Production of static electricity can thereby be more effec­tively prevented, and misfeeds can therefore be more effec­tively prevented.

Preferred embodiments of the invention are described above, but the invention is not limited thereto.

In addition, parts of the sheet manufacturing apparatus can be replaced with other configurations having the same function. Other desirable configurations can also be added.

For example, the sheet manufacturing apparatus may be configured without the preprocessing unit (contaminant removal unit) for removing color material and other con­taminants or foreign matter (matter derived from the ink or toner) from the feedstock (material containing fiber) to be defibrated to make sheets.

The foregoing embodiments focus on manufacturing sheets from recovered paper, but the invention is not so limited and may obviously use virgin fiber (such as virgin pulp).

EXAMPLES

The invention is further described below with reference to specific examples.

1. Making the Binder

Example 1

As the resin, 96 parts by weight polyester (ACT-6202 plastic, glass transition temperature=62° C.; DIC Corp.), and 4.0 parts by weight polyethylene glycol (PEG-20000, melting point: 63° C.; Sanyo Chemical Industries) as the polyhydric alcohol, were weighed and placed in a blender to make a dry blend.

The mixture from the dry blender was loaded into a twin-screw extruder/kneader and kneaded at 110° C. to produce a kneaded mixture of polyester and polyethylene glycol.

The kneaded mixture was then chilled, the solidified kneaded mixture crushed in a hammer mill, then ground in a jet mill, and past through a turbo classifier to obtain a powder containing particles in the desired particle size range (5 to 25 μm).

A high speed mixer then mixed 100 parts by weight of the powder with 2.0 parts by weight hydrophobic fumed silica (NX90G, Nippon Aerosil Co.) as a flow improver to coat the particles to get the binder in the desired particle form.

The resin (polyester) and polyhydric alcohol (polyethylene glycol) were phase separated in the resulting binder. The resulting binder contained 4.0 parts by weight polyhydric alcohol to 100 parts by weight resin, and 100 parts by weight of the kneaded mixture of the resin (polyester) and polyhydric alcohol (polyethylene glycol) included 2.0 parts by weight hydrophobic fumed silica. The average particle size of the binder particles was 10 μm.

Examples 2-4

Binder was produced in the same way as in example 1, except for changing the ratio of resin to polyhydric alcohol as shown in Table 1.

Examples 5, 6

Binder was produced in the same way as in example 1, except for changing the ratio of resin to polyhydric alcohol as shown in Table 1.

Examples 7, 8, 9

Resin and the types of polyhydric alcohol shown in Table 1 were weighed to obtain the specified ratios, and kneaded mixtures of the resin and polyhydric alcohol were then obtained through a twin-screw extruder/kneader as described in example 1. The kneaded mixtures were then milled and classified, and coated with hydrophobic fumed silica as in Example 1 to acquire the binder.

Example 10

Binder was produced as described in Example 1 except for using a different polyester resin (ACT-6100 plastic, Tg=60° C.; DIC Corp.) as the resin.

Example 11

Binder was produced as described in Example 3 except for using a different polyester resin (ACT-6100 plastic, Tg=60° C.; DIC Corp.) as the resin.

Example 12

Binder was produced as described in Example 4 except for using a different polyester resin (ACT-6100 plastic, Tg=60° C.; DIC Corp.) as the resin.

Comparison 1

A binder was made as described in Example 1 except that only polyester (ACT-6202 plastic; DIC Corp.) was used as the material in the kneaded mixture, and polyhydric alcohol was not used.

The conditions of the foregoing examples and comparison binders are shown in Table 1. The resin and polyhydric alcohol were phase separated in each of the binders in the above examples. Note that that in Table 1 ACT-6202 plastic (DIC Corp.) is denoted ACT-6202, ACT-6100 plastic (DIC Corp.) is denoted ACT-6100, polyethylene glycol is denoted PEG, and hydrophobic fumed silica (NX90G, Nippon Aerosil) is denoted NX90G.

TABLE 1

Table 1

| | RESIN | | | | POLYHYDRIC ALCOHOL | |
|---|---|---|---|---|---|---|
| | TYPE | WEIGHT-AVERAGE MOLECULAR WEIGHT | Tg (° C.) | CONTENT (parts/wt) | TYPE | WEIGHT-AVERAGE MOLECULAR WEIGHT |
| EXAMPLE 1 | ACT-6202 | 45000 | 62 | 96.0 | PEG | 20000 |
| EXAMPLE 2 | ACT-6202 | 45000 | 62 | 97.0 | PEG | 20000 |
| EXAMPLE 3 | ACT-6202 | 45000 | 62 | 99.0 | PEG | 20000 |
| EXAMPLE 4 | ACT-6202 | 45000 | 62 | 99.5 | PEG | 20000 |
| EXAMPLE 5 | ACT-6202 | 45000 | 62 | 96.0 | PEG | 6000 |
| EXAMPLE 6 | ACT-6202 | 45000 | 62 | 96.0 | PEG | 10000 |
| EXAMPLE 7 | ACT-6202 | 45000 | 62 | 96.0 | SUCRALOSE | 398 |
| EXAMPLE 8 | ACT-6202 | 45000 | 62 | 96.0 | MALTITOL | 344 |
| EXAMPLE 9 | ACT-6202 | 45000 | 62 | 96.0 | SORBITOL | 182 |
| EXAMPLE 10 | ACT-6100 | 10000 | 60 | 96.0 | PEG | 20000 |
| EXAMPLE 11 | ACT-6100 | 10000 | 60 | 99.0 | PEG | 20000 |
| EXAMPLE 12 | ACT-6100 | 10000 | 60 | 99.5 | PEG | 20000 |
| COMPARISON 1 | ACT-6202 | 45000 | 62 | 100 | — | — |

TABLE 1-continued

Table 1

| | POLYHYDRIC ALCOHOL | | COATING | | AVERAGE PARTICLE SIZE (μm) | PHASE SEPARATED IN PARTICLES |
|---|---|---|---|---|---|---|
| | mp (° C.) | CONTENT (parts/wt) | TYPE | CONTENT (parts/wt) | | |
| EXAMPLE 1 | 63 | 4.0 | NX90G | 2.0 | 10 | YES |
| EXAMPLE 2 | 63 | 3.0 | NX90G | 2.0 | 10 | YES |
| EXAMPLE 3 | 63 | 1.0 | NX90G | 2.0 | 10 | YES |
| EXAMPLE 4 | 63 | 0.5 | NX90G | 2.0 | 10 | YES |
| EXAMPLE 5 | 61 | 4.0 | NX90G | 2.0 | 10 | YES |
| EXAMPLE 6 | 62 | 4.0 | NX90G | 2.0 | 10 | YES |
| EXAMPLE 7 | 125 | 4.0 | NX90G | 2.0 | 10 | YES |
| EXAMPLE 8 | 140 | 4.0 | NX90G | 2.0 | 10 | YES |
| EXAMPLE 9 | 90 | 4.0 | NX90G | 2.0 | 10 | YES |
| EXAMPLE 10 | 63 | 4.0 | NX90G | 2.0 | 10 | YES |
| EXAMPLE 11 | 63 | 1.0 | NX90G | 2.0 | 10 | YES |
| EXAMPLE 12 | 63 | 0.5 | NX90G | 2.0 | 10 | YES |
| COMPARISON 1 | — | — | NX90G | 2.0 | 10 | NO |

2. Manufacturing a Sheet

A system as shown in FIG. 1 was prepared, and A4 size sheets were made by the method described above using recovered paper as the feedstock and the binder produced as described in the above examples and comparison.

The heating temperature of the heating process was 170° C. The content ratio of binder in the manufactured sheets was controlled to 20.0 wt %. Except for changing the binder, the manufacturing conditions were the same in all examples and the comparison. The polyhydric alcohol was biased to the surface of the sheet in each of the sheets manufactured in each example.

Sheets were also produced in the same way as the above example and comparison except for not using the binder.

3. Evaluation 3-1. Sheet Resistance

The sheet resistance was measured on both sides of the sheets made in the above examples and comparisons using a Hiresta-UP resistivity meter (MCP-HT450, Mitsubishi Chemical), and the average of the two measurements was calculated as the sheet resistance of the sheet. The applied electrode voltage was set to 100 V, and resistance was measured for 1 minute.

3-2. Paper Feed Test

The sheets made in the above examples and comparisons were loaded into the cassette of a laser printer (LP-S6500, Seiko Epson), and a 5% ISO pattern was printed on one side.

3-3. Paper Strength Test (Tensile Strength)

A 1BA test sample (75 mm long) as defined in JIS K7162 was cut from each of the sheets of the above examples and comparisons, and the tensile strength was tested according to JIS K7161 at a temperature of 23° C. and relative humidity of 50%.

The test results are shown in Table 2.

TABLE 2

| | SHEET RESISTANCE (×10$^{10}$ Ω/□) | PAPER FEED TEST 10° C./20% RH (%) | RELATIVE TENSILE STRENGTH (%) |
|---|---|---|---|
| EXAMPLE 1 | 15.7 | 96.4 | 60.9 |
| EXAMPLE 2 | 12.3 | 96.4 | 58.2 |
| EXAMPLE 3 | 24.1 | 99.0 | 64.0 |
| EXAMPLE 4 | 33.9 | 98.6 | 76.8 |
| EXAMPLE 5 | 30.9 | 98.5 | 64.0 |
| EXAMPLE 6 | 24.9 | 98.9 | 64.7 |
| EXAMPLE 7 | 41.0 | 98.0 | 62.3 |
| EXAMPLE 8 | 47.1 | 97.8 | 68.8 |
| EXAMPLE 9 | 39.5 | 98.0 | 65.0 |
| EXAMPLE 10 | 18.2 | 99.2 | 59.2 |
| EXAMPLE 11 | 29.7 | 98.3 | 61.8 |
| EXAMPLE 12 | 36.3 | 98.1 | 75.6 |
| COMPARISON 1 | 127.0 | 89.2 | 100.0 |
| COMPARISON 2 | 135.0 | 1.0 | 23.1 |

As will be understood from Table 2, outstanding results were obtained with the sheets according to the invention, while satisfactory results were not obtained with the comparisons.

For reference, the relationship between sheet resistance and misfeed rate was measured using common office paper (plain paper) was measured. The results are shown in Table 3.

TABLE 3

| OFFICE PAPER | SHEET RESISTANCE (×10$^{10}$ Ω/□) | MISFEED RATE 10° C./20% RH | MISFEED RATE 23° C./50% RH |
|---|---|---|---|
| BRAND A | 97.4 | 9.4% | 0.4% |
| BRAND B | 73.3 | 9.0% | 0.6% |
| BRAND C | 38.5 | 1.80 | 0% |
| BRAND D | 18.9 | 0.6% | 0% |
| BRAND E | 6.7 | 0% | 0% |

It will also be understood from Table 3 that there is a positive correlation between the sheet resistance of the sheet (the ease with which static electricity is produced) and the misfeed rate.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2017-192073, filed Sep. 29, 2017 is expressly incorporated by reference herein.

What is claimed is:

1. A binder for binding fiber and making a sheet, the binder comprising:
a resin having a glass transition temperature in the range of from 50° C. to 100° C.; and
a polyhydric alcohol that is a solid at room temperature and changes to liquid phase when heated,
wherein the binder is in a particle form.

2. The binder described in claim 1, wherein:
the resin is polyester.

3. The binder described in claim 1, wherein:
the polyhydric alcohol is polyalkylene glycol.

4. The binder described in claim 3, wherein:
a monomer of the polyalkylene glycol is represented by the following formula (1):

$$(C_nH_{2n})(OH)_2 \quad (1)$$

where n is an integer of 3 or more.

5. The binder described in claim 1, wherein:
the content of polyhydric alcohol to 100 parts by weight resin is greater than or equal to 0.1 parts by weight and less than or equal to 20 parts by weight.

6. The binder described in claim 1, wherein:
the resin and the polyhydric alcohol are phase separated in the particles.

7. The binder described in claim 1, wherein:
the average particle size of the particles is greater than or equal to 5 μm and less than or equal to 20 μm.

8. The binder described in claim 1, wherein:
the melting point of the polyhydric alcohol is higher than the glass transition temperature of the resin.

9. The binder described in claim 1, wherein:
the polyhydric alcohol has a number-average molecular weight in the range of from 5,000 to 60,000.

10. The binder described in claim 1, wherein:
the polyhydric alcohol has a number-average molecular weight in the range of from 20,000 to 60,000.

11. A sheet manufacturing apparatus comprising:
a defibrator configured to defibrate material containing fiber;
a binder supply device configured to supply binder in a particle form to the defibrated material defibrated by the defibrator; and
a heater configured to heat the defibrated material to which the binder was supplied;
the binder containing:
a resin having a glass transition temperature in the range of from 50° C. to 100° C., and
a polyhydric alcohol that is a solid at room temperature and changes to liquid phase when heated.

12. A sheet manufacturing method comprising:
a defibrating step of defibrating material containing fiber;
a binder supply step of supplying the binder described in claim 1 to the defibrated material defibrated in the defibrating step; and
a heating step of heating the defibrated material to which the binder was supplied;
wherein the polyhydric alcohol contained in the binder changes to liquid phase during heating in the heating step.

13. A sheet made of fibers bonded by a binder, wherein:
the binder contains:
a resin having a glass transition temperature in the range of from 50° C. to 100° C., and
a polyhydric alcohol that is a solid at room temperature and changes to liquid phase when heated, and
the polyhydric alcohol is concentrated at the surface of the sheet.

14. The sheet described in claim 13, wherein:
the sheet resistance of the sheet is less than or equal to $70 \times 10^{10}$ Ω/square.

15. A binder for binding fiber and making a sheet, the binder comprising:
a resin having a glass transition temperature in the range of from 50° C. to 100° C.; and
a polyalkylene glycol that is a solid at room temperature and changes to liquid phase when heated,
wherein a monomer of the polyalkylene glycol is represented by the following formula (1):

$$(C_nH_{2n})(OH)_2 \quad (1)$$

where n is an integer of 3 or more.

* * * * *